United States Patent
Onuma et al.

(10) Patent No.: US 11,135,943 B2
(45) Date of Patent: Oct. 5, 2021

(54) VEHICLE SEAT HAVING INTERNAL SUPPORT MEMBER

(71) Applicants: TS TECH CO., LTD., Asaka (JP); HONDA MOTOR CO., LTD., Tokyo (JP)

(72) Inventors: Koji Onuma, Tochigi (JP); Soichiro Kamei, Tochigi (JP); Yozo Furuta, Saitama (JP); Shinobu Sasaki, Saitama (JP); Daisuke Ohkawa, Saitama (JP); Koji Sano, Saitama (JP); Hiroto Horie, Saitama (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/778,573

(22) Filed: Jan. 31, 2020

(65) Prior Publication Data
US 2020/0247271 A1    Aug. 6, 2020

(30) Foreign Application Priority Data
Feb. 1, 2019    (JP) .............................. JP2019-017509

(51) Int. Cl.
*B60N 2/00*    (2006.01)
*B60N 2/68*    (2006.01)

(52) U.S. Cl.
CPC ............. *B60N 2/002* (2013.01); *B60N 2/682* (2013.01); *B60N 2/686* (2013.01)

(58) Field of Classification Search
CPC . B60N 2/002; B60N 2/62; B60N 2/68; B60N 2/682; B60N 2/686; B60N 2/7094; B60N 2/72; B60R 22/48; B60R 2022/4858
See application file for complete search history.

(56) References Cited

U.S. PATENT DOCUMENTS

| | | | | |
|---|---|---|---|---|
| 2,366,680 A | * | 1/1945 | Valentine | A47C 7/021 297/452.22 |
| 8,662,483 B2 | | 3/2014 | Yamaguchi et al. | |
| 9,630,525 B2 | * | 4/2017 | Nakazaki | H01H 3/14 |

(Continued)

FOREIGN PATENT DOCUMENTS

| JP | 2016144987 A | 8/2016 |
|---|---|---|
| JP | 2018052498 A | 4/2018 |
| JP | 6309130 B1 | 10/2018 |

*Primary Examiner* — James M Ference
(74) *Attorney, Agent, or Firm* — Armstrong Teasdale LLP

(57) ABSTRACT

A vehicle seat includes an internal support member for supporting a seat occupant. The internal support member includes a main body in plate or sheet form positioned within a seat cushion frame and first and second mounting portions engaged by first and second cross members of the seat cushion frame. A pressure sensor is mounted on a part of an upper surface of the internal support member which is closer to the first cross member than the second cross member. The main body of the internal support member is formed with a pair of openings positioned on either side of a central longitudinal line. A sensor mounting portion supporting the pressure sensor is defined between mutually adjoining edges of the openings. The first mounting portion includes a central first mounting piece which is positioned laterally centrally and has a greater width than the sensor mounting portion.

12 Claims, 3 Drawing Sheets

(56) References Cited

U.S. PATENT DOCUMENTS

| | | | |
|---|---|---|---|
| 10,532,679 B2 | 1/2020 | Onuma et al. | |
| 10,538,212 B2 | 1/2020 | Onuma | |
| 10,654,385 B2 | 5/2020 | Onuma et al. | |
| 10,857,958 B2 | 12/2020 | Onuma | |
| 2007/0267282 A1* | 11/2007 | Sallam | B60R 21/01516 200/85 A |
| 2010/0133732 A1* | 6/2010 | Yamaguchi | B60N 2/7052 267/140.4 |
| 2011/0248534 A1* | 10/2011 | Pinto Ribeiro | B60N 2/002 297/217.1 |
| 2015/0283923 A1* | 10/2015 | Kordel | A61G 5/1091 297/452.49 |
| 2015/0291072 A1* | 10/2015 | Ito | B60N 2/1675 297/452.2 |
| 2015/0321590 A1* | 11/2015 | Mizoi | B60N 2/66 297/284.1 |
| 2015/0343932 A1* | 12/2015 | Hosoe | B60N 2/72 297/452.52 |
| 2016/0221481 A1* | 8/2016 | Sugiyama | B60N 2/2222 |
| 2017/0036575 A1* | 2/2017 | Kobayashi | B60N 2/68 |
| 2018/0272906 A1* | 9/2018 | Onuma | B60N 2/682 |
| 2018/0272908 A1* | 9/2018 | Onuma | B60N 2/7094 |
| 2018/0272909 A1* | 9/2018 | Misono | B60N 2/70 |
| 2018/0272969 A1* | 9/2018 | Onuma | B60R 16/0215 |
| 2019/0031065 A1* | 1/2019 | Kamei | B60N 2/686 |
| 2020/0247270 A1* | 8/2020 | Onuma | B60N 2/682 |
| 2020/0247271 A1* | 8/2020 | Onuma | B60N 2/002 |
| 2020/0247292 A1* | 8/2020 | Onuma | B60N 2/682 |
| 2020/0282885 A1* | 9/2020 | Onuma | B60N 2/1615 |

\* cited by examiner

VEHICLE SEAT HAVING INTERNAL SUPPORT MEMBER

TECHNICAL FIELD

The present invention relates to a vehicle seat, and more particularly to a vehicle seat having an internal support member provided inside a seat cushion frame to support an occupant.

BACKGROUND ART

Vehicle seats provided with an internal support member are known in the art. JP6309130B1 discloses an internal support member made of a plastic sheet or plate member and placed inside a seat cushion frame to support a seat occupant. The internal support member includes a pair of inclined portions which are located on either side of a rear part thereof and inclining upward toward laterally outer sides thereof. The inclined portions support the hip of the occupant from either side thereof so that a large part of the pressure is supported by the inclined portions. In the vehicle seat disclosed in JP2016-144987A, a pressure sensor is provided between an internal support member and a seat cushion pad to detect the presence of an occupant.

When a pressure sensor is placed on an inclined portion of the internal support member, since a large part of pressure from the buttocks of the occupant is diverted to the inclined portions, the pressure sensor may not be able to accurately detect the presence of an occupant. In particular, the distinction between an actual occupant and an object such as a cargo may not be correctly made.

SUMMARY OF THE INVENTION

In view of such a problem of the prior art, a primary object of the present invention is to provide a vehicle seat having an internal support member made of a sheet or plate material and placed inside a seat cushion frame to support a seat occupant, and a pressure sensor provided on the internal support member, and allowing the presence of an occupant to be accurately detected from the signal of the pressure sensor.

To achieve such an object, the present invention provides a vehicle seat (1) having a seat cushion (3), the vehicle seat comprising: a seat cushion frame (7) including a pair of side members (14) extending along either side of the seat cushion frame, a first cross member (15) connecting first ends of the side members to each other, and a second cross member (16) connecting second ends of the side members to each other; an internal support member (8) for supporting an occupant, the internal support member including a main body (20) in plate or sheet form positioned within the seat cushion frame and extending substantially in parallel with the seat cushion frame, a first mounting portion (22) extending from a first edge of the main body adjoining the first cross member and engaged by the first cross member, and a second mounting portion (23) extending from a second edge of the main body adjoining the second cross member and engaged by the second cross member; a cushion pad (9) placed on an upper side of the seat cushion frame and the internal support member; a skin member (10) covering the cushion pad; and a pressure sensor (25) mounted on a part of an upper surface of the internal support member which is closer to the first cross member than the second cross member; wherein the main body of the internal support member is formed with a pair of openings (28) positioned on either side of a central longitudinal line, a sensor mounting portion (26) supporting the pressure sensor being defined between mutually adjoining edges of the openings, and wherein the first mounting portion includes a central first mounting piece (22a) which is positioned laterally centrally and has a greater width than the sensor mounting portion. Typically, the first cross member consists of a front cross member, and the second cross member consists of a rear cross member. Also, typically, the seat cushion frame is substantially rectangular in shape in plan view, and the openings are substantially rectangular in shape in plan view, and are arranged in a symmetric relationship to the longitudinal center line.

Since the openings are provided on either side of the pressure sensor, the pressure applied to the pressure sensor is amplified. Since the swinging motion of the pressure sensor is prevented owing to a large lateral width of the central first mounting piece, the accuracy of detecting a seat occupant can be improved.

Preferably, the main body of the internal support member is formed with a plurality of clip mounting holes (35) in parts thereof located on either side of the sensor mounting portion.

The clip mounting holes are used for securing clips that retain other members such as a wire harness. Since the clip mounting holes are laterally offset from the central first mounting piece, the capability of the sensor mounting portion to retain the pressure sensor in a stable manner can be ensured.

Preferably, the central first mounting piece is formed with an opening (42). In particular, the central first mounting piece may include a pair of inner openings (42a) arranged symmetric to each other about the longitudinal center line, and a pair of outer openings (42b) arranged symmetric to each other about the longitudinal center line on either outer side of the inner openings, the inner openings being larger than the outer openings.

Owing to the presence of the opening or openings, the central first mounting piece can be given with a suitable deformability so that the internal support member can be secured to the first cross member without creating any localized stress. This also contributes to a high detection accuracy of the pressure sensor. This is particularly the case when the inner openings overlap with the sensor mounting portion by a larger width than the outer openings in front view. When the inner openings are larger than the outer openings, the central first mounting piece demonstrates a suitable flexibility that prevents any undue stress concentration, and a high stability in supporting the sensor mounting portion.

Preferably, the central first mounting piece consists of an integral part of the main body which is wrapped around the first cross member.

Thereby, the internal support member can be connected to the first cross member in a secure and reliable manner without creating any undue localized stress in the internal support member.

Preferably, the internal support member consists of a sheet of plastic material having a plurality of wires (24) extending in a longitudinal direction insert molded therein, and one of the wires extends centrally through the sensor mounting portion.

The wire extending centrally through the sensor mounting portion allows the sensor mounting portion to support the pressure sensor in a stable manner so that the detection accuracy of the pressure sensor can be improved.

Preferably, the sensor mounting portion is provided with a pair of engaging claws (46) that engage the pressure sensor, the engaging claws being positioned laterally between side edges of the central first mounting piece.

Since the engaging claws are positioned within the lateral expanse of the central first mounting piece, the pressure sensor can be retained by the engaging claws in a secure manner.

Preferably, the engaging claws align at least partly with the inner openings of the central first mounting piece in front view.

Since the engaging claws overlap with the first mounting piece opening in front view, deformation of the central first mounting piece is prevented from causing the engaging claws to adversely affect the pressure detecting performance of the pressure sensor.

Preferably, the first mounting portion includes a pair of outer first mounting pieces (22b) located on either side of the central first mounting piece, and each outer first mounting piece is formed with a rectangular opening (43) and a cutout (44), the cutout being made on a side edge of the outer first mounting piece.

Owing to the presence of the rectangular opening and the cutout in each outer first mounting piece, the laterally outer regions of the internal support member are given with a suitable deformability so that the seating comfort can be improved without impairing the detecting performance of the pressure sensor.

Preferably, the sensor mounting portion is further provided with a pair of engaging ribs (47) configured to engage side edges of the pressure sensor, the engaging ribs being positioned laterally inward of side edges of the central first mounting piece in front view.

Thereby, the lateral positioning of the pressure sensor can be stabilized by using a highly simple structure.

Preferably, a pair of inclined portions are provided on either lateral end part of the internal support member adjacent to the second cross member, each inclined portion inclining upward toward a laterally outer edge of the internal support member, and a plurality of openings are provided in a part of the internal support member located between the inclined portions.

The inclined portions favorably support the buttocks of the occupant from either lateral side. Since the pressure sensor is positioned forward away from the inclined portions, the detection performance of the pressure sensor can be enhanced. The presence of the openings located between the inclined portions enhances the seating comfort of the occupant, and provide a means for engaging clips and other objects or passing through a wire-like object.

According to another aspect of the present invention, the present invention provides a vehicle seat (1) having a seat cushion (3), the vehicle seat comprising: a substantially rectangular seat cushion frame (7) including a pair of side members (14) extending along either side of the seat cushion frame, a first cross member (15) connecting first ends of the side members to each other, and a second cross member (16) connecting second ends of the side members to each other, and an internal support member (8) for supporting an occupant, the internal support member including a main body (20) in plate or sheet form positioned within the seat cushion frame and extending substantially in parallel with the seat cushion frame, a first mounting portion (22) extending from a first edge of the main body adjoining the first cross member and engaged by the first cross member, and a second mounting portion (23) extending from a second edge of the main body adjoining the second cross member and engaged by the second cross member; a cushion pad (9) placed on an upper side of the seat cushion frame and the internal support member; a skin member (10) covering the cushion pad; and a pressure sensor (25) mounted on an upper surface of the internal support member; wherein the main body of the internal support member is formed with a plurality of clip mounting holes (35) in parts thereof offset from the pressure sensor in a lateral direction.

Preferably, the clip mounting holes are positioned so as to be offset from the pressure sensor in a longitudinal direction.

Preferably, the internal support member is provided with a pair of downwardly recessed parts (40) on either side of the openings, and at least a part of the clip mounting holes are provided in the recessed parts.

The internal support member is further provided with a pair of inclined portions (21) inclining upward from either lateral side of a rear portion (20a) of the main body toward laterally outer sides thereof, and at least a part of the clip mounting holes may be provided laterally inward of the inner edges of the inclined portions.

Preferably, the rear portion of the main body is devoid of clip mounting holes.

Further, when the front portion (20b) of the internal support member (8) located forward of the inclined portions and having a greatest lateral width is divided into three equal rectangular regions, a central region (A) and a pair of side regions (B), arranged in the lateral direction, the number of clip mounting holes 35 included in each side region B is preferably greater than the number of clip mounting holes 35 included in the central region A.

Preferably, the parts of the lateral edges of the internal support member located ahead of the inclined portions are each provided with a side notch (33), and at least a part of the clip mount holes are aligned with the side notches in side view.

At least two of the clip mounting holes are aligned in the longitudinal direction.

According to yet another aspect of the present invention, the present invention provides a vehicle seat (1) having a seat cushion (3), the vehicle seat comprising: a substantially rectangular seat cushion frame (7) including a pair of side members (14) extending along either side of the seat cushion frame, a front cross member (15) connecting front ends of the side members to each other, and a rear cross member (16) connecting rear ends of the side members to each other, and an internal support member (8) for supporting an occupant, the internal support member including a main body (20) in plate or sheet form positioned within the seat cushion frame and extending substantially in parallel with the seat cushion frame, a pair of inclined portions (21) inclining upward from either lateral side of a rear portion (20a) of the main body toward laterally outer sides thereof, a front mounting portion (22) extending from a front edge of the main body and engaged by the front cross member, and a rear mounting portion (23) extending from a rear edge of the main body and engaged by the rear cross member; a cushion pad (9) placed on an upper side of the seat cushion frame and the internal support member; a skin member (10) covering the cushion pad; and a pressure sensor (25) mounted on a part of an upper surface of a front portion (20b) of the main body of the internal support member which is located ahead of the inclined portions; wherein a rear end of each side edge of the front portion of the internal support member located ahead of the corresponding inclined portion is formed with a side notch (33), and an intermediate part of the side edge of the front portion is located more laterally outward than a corresponding outer side edge of the front mounting portion so that a pair of wing portions are formed on either side edge of the front portion.

Preferably, the wing portions partly align with the pressure sensor in the lateral direction.

Preferably, the support member is formed with a pair of substantially rectangular openings (28) on either side of the pressure sensor, and the longitudinal length of the openings is 1.2 times the longitudinal length of the pressure sensor or smaller.

Preferably, each wing portion is formed with a clip mounting hole (35) configured to mount a clip (32) thereto.

Preferably, the vehicle seat further comprises a height brake for controlling the vertical motion of the seat cushion, and the clip is provided so as not to interfere with the height brake in plan view.

Preferably, at least a part of the clip mounting holes are provided in the wing portions and/or adjacent to the front mounting portion.

Preferably, at least a part of the clip mounting holes are aligned with the pressure sensor in front view. Preferably, the sensor mounting portion (26) of the internal support member supporting the pressure sensor is provided with a mounting portion opening (45), and at least a part of the clip mounting holes are aligned with the mounting portion opening in front view.

According to a certain aspect of the present invention, since the pressure sensor is located so as to be offset from the inclined portions in the forward direction, and a pair of openings are formed in the parts of the internal support member located on either side of the pressure sensor, the pressure applied to the pressure sensor by the seat occupant can be amplified. Since the lateral width of the central front mounting piece aligning with the pressure sensor in front view is greater than the sensor mounting portion of the internal support member, the swinging motion of the pressure sensor can be restricted so that the detection accuracy of the pressure sensor in detecting the presence of a seat occupant can be improved.

According to a certain aspect of the present invention, since the sensor mounting portion is provided so as to overlap with the central front mounting piece in front view, the sensor mounting portion can be maintained in a stable condition owing to the central front mounting piece which is secured to the front cross member.

According to a certain aspect of the present invention, clip mounting holes are provided in the internal support member so that clips each retaining a certain component part such as a wire harness can be mounted to the internal support member, and the clip mounting holes are placed so as to be offset from the central front mounting piece in front view so that the sensor mounting portion may be given with an adequately high stiffness.

According to a certain aspect of the present invention, since the central front mounting piece is formed with a first mounting piece opening, the central front mounting piece can be attached to the front cross member in a highly secure manner while ensuring a suitable flexibility in this part.

According to a certain aspect of the present invention, the central front mounting piece is formed with a pair of inner openings, and a pair of outer openings located on either outer side of the inner opening. Therefore, the flexibility of the laterally middle part of the internal support member is ensured so that the pressure sensor is prevented from receiving any undue load.

According to a certain aspect of the present invention, since the inner openings overlap with the sensor mounting portion in front view by a greater width than the outer openings, the flexibility of the sensor mounting portion can be adjusted to an appropriate level.

According to a certain aspect of the present invention, since the pressure sensor is engaged by the engaging claws provided in the parts of the internal support member which are relatively firmly attached to the front cross member, the pressure sensor can be maintained in a stable condition.

According to a certain aspect of the present invention, since the engaging claws overlap with a part of the first mounting piece opening, the engaging claws are prevented from adversely affecting the performance of the pressure sensor owing to the flexibility of the part of the internal support member adjacent to the first mounting piece opening.

According to a certain aspect of the present invention, since the outer front mounting pieces are each provided with a second mounting piece opening and a cutout, the laterally outer parts of the internal support member are given with a high level of flexibility.

According to a certain aspect of the present invention, the pressure sensor can be retained in a stable manner by using a pair of engagement ribs abutting against side edges of the pressure sensor.

BRIEF DESCRIPTION OF THE DRAWING(S)

DESCRIPTION OF THE PREFERRED EMBODIMENT(S)

The vehicle seat 1 according to the preferred embodiment of the present invention is described in the following with reference to the appended drawings. The various directions mentioned in the following disclosure will be based on the view point of an occupant seated on the vehicle seat.

Figure 1:
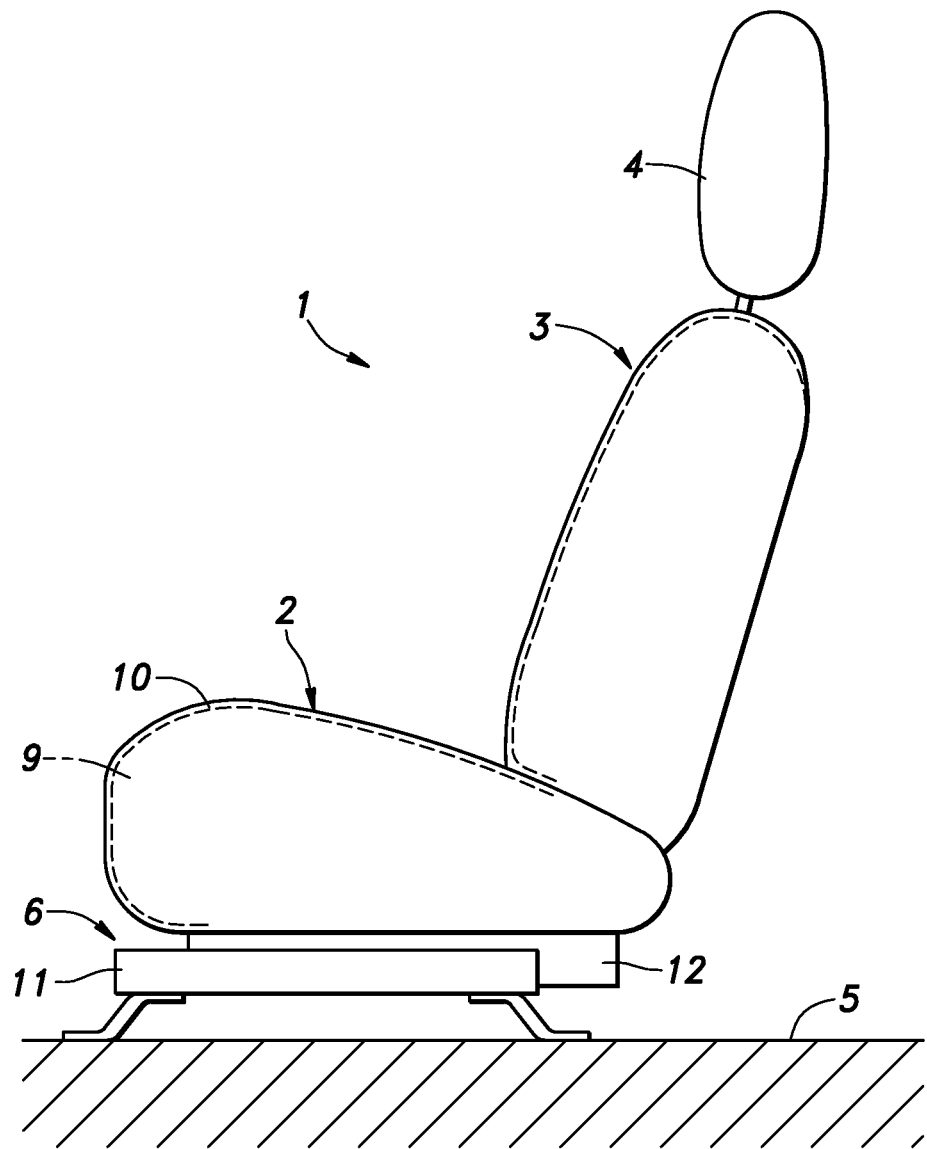
FIG. 1 is a schematic side view of a vehicle seat according to a preferred embodiment of the present invention.

The vehicle seat 1 illustrated in FIG. 1 may be used either as a driver's seat or a passenger seat, and includes a seat cushion 2, a seat back 3, and a headrest 4 in a per se known manner. The seat cushion 2 is supported by a floor 5 of a passenger compartment of the vehicle via a pair of slide rails 6. The vehicle seat 1 includes a seat cushion frame 7, a cushion pad 9 made of urethane foam or the like, and placed on the seat cushion frame 7, and a skin member 10 covering the cushion pad 9. Each slide rail 6 consists of a lower rail 11 fixed to the floor 5 and an upper rail 12 slidably supported by the lower rail 11, and fixed to the seat cushion frame 7 so that the fore and aft position of the vehicle seat 1 may be adjusted in a per se known manner.

The seat cushion frame 7 has a rectangular configuration in plan view, and supports an internal support member 8 positioned within the seat cushion frame 7 and configured to resiliently support the load of the occupant via the skin member 10, and the cushion pad 9. The seat cushion frame 7 and the internal support member 8 are generally symmetric about a central longitudinal line.

The seat cushion frame 7 includes a pair of side members 14 extending along either side thereof, a front cross member 15 connecting the front ends of the side members 14 to each other, a rear cross member 16 connecting the rear ends of the side members 14 to each other, and a pan frame 17 connected to the front ends of the left and right side members 14, and generally located ahead of the front cross member 15. Each side member 14 consists of a metal channel member elongated in the fore and aft direction, and having a pair of flanges extending laterally from the upper and the lower edges thereof, respectively. The front cross member 15 and the rear cross member 16 each consist of a metal pipe member elongated in the lateral direction. The pan frame 17 consists of a stamp formed sheet metal, and is provided with a contoured surface substantially conforming to the front part of the seating surface.

Figure 2:
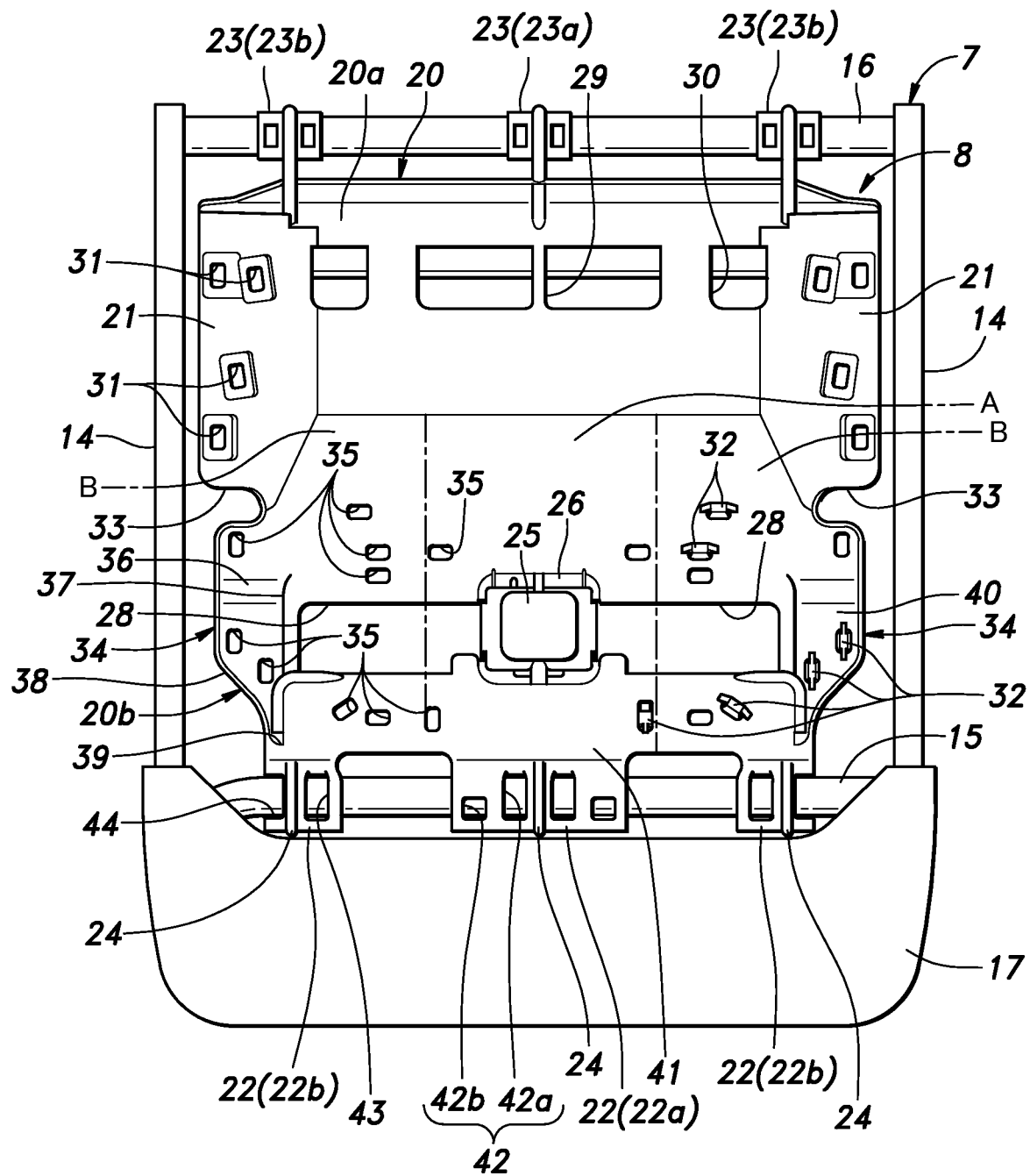
FIG. 2 is a plan view of a seat cushion frame and an internal support member of the vehicle seat.
Figure 3:
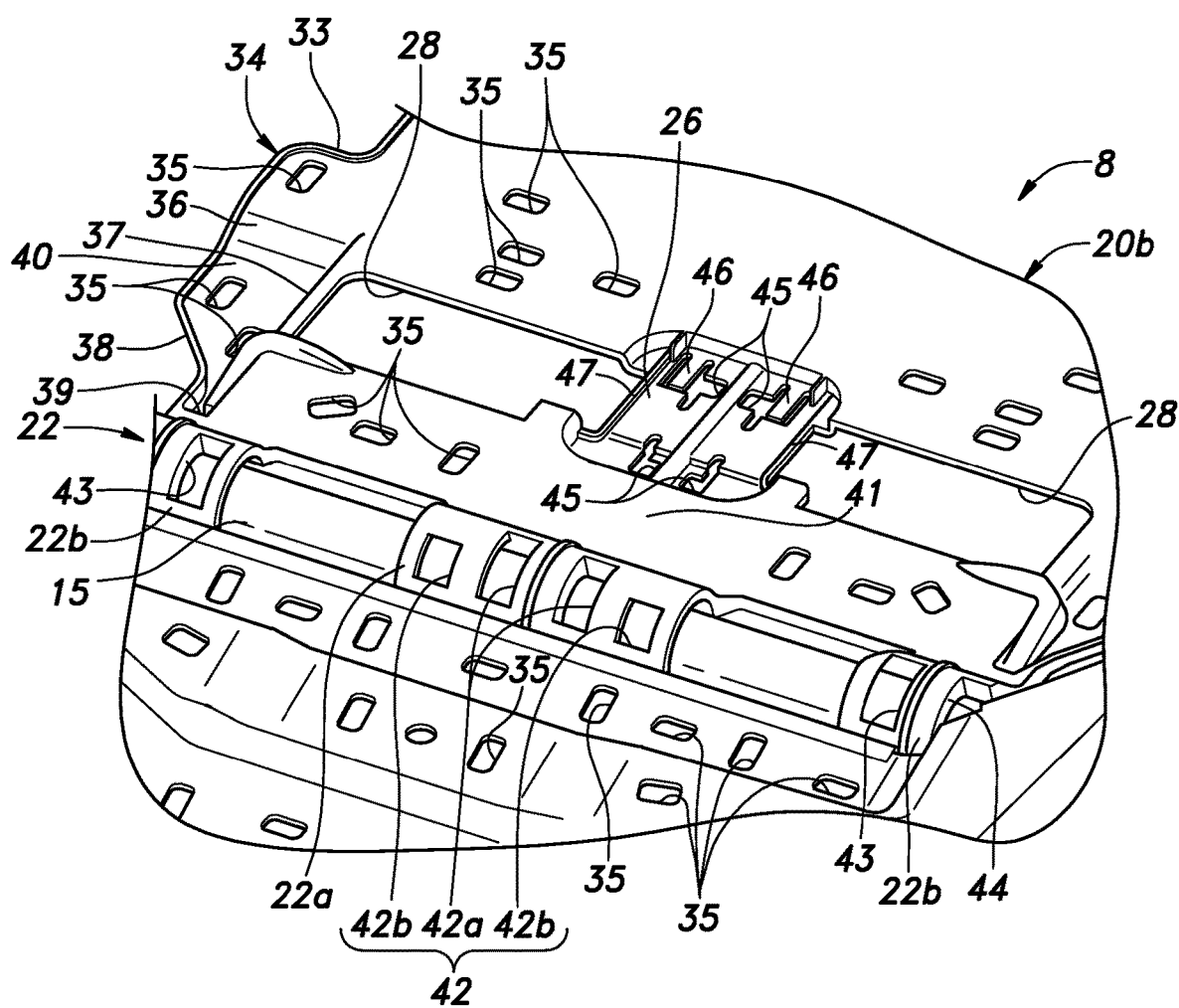
FIG. 3 is a fragmentary perspective view of a front part of the internal support member.

As shown in FIGS. 2 and 3, the internal support member 8 includes a main body 20 in sheet or plate form extending substantially horizontally, a pair of inclined portions 21 extending obliquely upward toward the corresponding lateral outer side edge thereof from either lateral edge of a rear portion 20a of the main body 20, a front mounting portion 22 extending forward from a front edge of the main body 20 and secured to the front cross member 15, and a rear mounting portion 23 extending rearward from a rear edge of the main body 20, and secured to the rear cross member 16. The part of the main body 20 which is located ahead of a middle point of the rear portion 20a with respect to the longitudinal direction is slightly inclined upward toward the front end of the main body 20. The internal support member 8 is formed by a plastic sheet material, and is provided with three wires 24 extending in the fore and aft direction in a mutually spaced apart relationship and insert molded in the plastic sheet material. The three wires 24 support a large part of the load of the occupant. The front mounting portion 22 consists of three front mounting pieces 22 (a central front mounting piece 22a and a pair of outer front mounting pieces 22b) which are located at a laterally central part and either side end part of the front edge of the main body 20, respectively. Each front mounting piece 22a, 22b is secured to the front cross member 15 by being wrapped around the front cross member 15 from above. The rear mounting portion 23 also consists of three rear mounting pieces 23 (a central rear mounting piece 23a and a pair of outer rear mounting pieces 23b) which are located at a laterally central part and either side end part of the rear edge of the main body 20, respectively. Each rear mounting piece 23a, 23b is secured to the rear cross member 16 by being wrapped around the front cross member 15 from above.

A pair of rectangular openings 28 are formed in a front part of the main body 20. A sensor mounting portion 26 is defined as a rectangular region of the main body 20 located between the openings 28. Again, the rectangular openings 28 and the sensor mounting portion 26 are formed so as to be symmetric with respect to the longitudinal center line of the vehicle seat 1. The central wire 24 passes centrally through the sensor mounting portion 26, and the remaining wires 24 extend along the laterally outer edges of the rectangular openings 28, respectively.

A pressure sensor 25 is mounted on the sensor mounting portion 26. The pressure sensor 25 may be used for a seat belt reminder (SBR) system that issues a warning when the occupant fails to wear the seat belt. In the rear portion 20a of the main body 20, the load of the occupant tends to be spread over a wide area due to the presence of the inclined portions 21 so that the pressure of the seat occupant applied to the rear portion 20a of the main body 20 for each given area tends to be reduced. Therefore, the pressure sensor 25 is positioned well ahead of the inclined portions 21 so as to avoid the influence of the inclined portions 21 on the pressure distribution. As a result, detection of a seat occupant which is typically performed by an ECU that receives the signal from the pressure sensor 25 can be achieved with a high accuracy.

The vehicle seat 1 (see FIG. 1) is fitted with an air ventilation system that improves the seating comfort by drawing or blowing air into or out of the surface of the vehicle seat 1. The openings 28 provide air passages for this air ventilation system. Each opening is rectangular in shape as mentioned earlier, and the inner edges of the openings 28 define the side edges of the sensor mounting portion 26.

The rear portion 20a of the main body 20 is provided with three substantially rectangular openings (including a central opening 29 and a pair of outer openings 30) that are arranged laterally for engaging a plurality of hooks (not shown) connected to the skin member 10, and adjusting the bending stiffness of the internal support member 8. The central opening 29 located at the center and a pair of outer openings 30 located on either side of the central opening 29. The central wire 24 passes centrally through the central opening 29, and divides the central opening 29 into two substantially equal parts.

The inclined portions 21 are provided with a plurality of tubular protrusions 31 each protruding downward (on the back side or lower side of the main body 20). Each tubular protrusion 31 is provided with a bottom wall, and a small opening is formed in the bottom wall. A clip 32 may be passed through each small opening. A lower part of the clip 32 located under the bottom wall may retain a member to be retained while an upper part of the clip 32 projecting upward through the opening may engage the upper surface of the bottom wall so that the member to be retained may be secured to the internal support member 8 via the tubular protrusion 31. Since the upper end of the clip 32 is located inside the tubular protrusion 31, and does not protrude upward from the surface of the inclined portions 21, the presence of the clip 32 does not adversely affect the seating comfort of the vehicle seat 1.

An intermediate part of each side edge of the internal support member 8 located immediately ahead of the front end of the corresponding inclined portion 21 is provided with a side notch 33. The side notch 33 prevents concentration of stress in the part of the internal support member 8 surrounding the front end of the inclined portion 21, and reduces the weight of the internal support member 8.

Each side edge of a front portion 20b of the main body 20 is provided with a wing portion 34 since the side notch 33 is provided, and the intermediate part of the side edge of a front portion 20b is located generally more outward than the front mounting portion 22. The wing portions 34 are not inclined with respect to the laterally middle part of the front portion 20b, and the wing portions 34 are partly aligned with the pressure sensor 25 in side view. Since the load applied to the front portion 20b is distributed by the wing portions 34, an excessive load is prevented from being applied to the pressure sensor 25. The length of the front portion 20b in the fore and aft direction is shorter than the length of the rear portion 20a in the fore and aft direction, and the outer edge of each wing portion 34 is located laterally inward of the outer edge of the corresponding inclined portion 21. For this reason, the load applied to the front portion 20b is reduced, and the load applied to the rear portion 20a is distributed laterally so that the strength of the internal support member 8 is improved as a whole. In order to prevent an excessive reduction in stiffness in the parts of the main body 20 located between the wing portions 34 and the sensor mounting portion 26, the longitudinal length of the openings 28 is preferably 1.2 times the longitudinal length of the pressure sensor or less.

A plurality of clip mounting holes 35 are provided in the front portion 20b of the main body 20 for retaining clips 32.

The clip mounting holes 35 are generally offset from the sensor mounting portion 26 both in the lateral direction and the longitudinal direction. The pressure applied to the pressure sensor 25 could be affected by the presence of the tips of the clips 32 protruding from the upper surface of the internal support member 8 via the clip mounting holes 35, but since the clip mounting holes 35 are offset from the sensor mounting portion 26 both in the lateral direction and the longitudinal direction, the influences of the protruding tips of the clips can be minimized. For the purpose of reducing the bending stiffness of the part of the internal support member 8 surrounding the sensor mounting portion 26, some of the clip mounting holes 35 may not be offset from the sensor mounting portion 26 in the fore and aft direction, instead of being offset from the sensor mounting portion 26 in the longitudinal direction. In order to effectively utilize the space between the sensor mounting portion 26 and the rear portion 20a, some of the clip mounting holes 35 may be provided behind the rear edge of the sensor mounting portion 26.

Further, when the front portion 20b of the internal support member 8 is divided into three equal rectangular regions arranged in the lateral direction, a central region A and a pair of side regions B, the number of clip mounting holes 35 included in each side region B is greater than the number of clip mounting holes 35 included in the central region A. By distributing the clip mounting holes 35 in this manner, the stiffness of the central region A located close to the pressure sensor 25 is prevented from being unduly decreased. In addition, some of the clip mounting holes 35 may be provided at positions laterally aligning with the side notches 33. Thereby, when the pressure sensor 25 receives a load, the front portion 20b of the main body 20 is more readily deformable than the inclined portions 21. In addition, in order to effectively utilize the space available in the lateral direction, some of the clip mounting holes 35 may be aligned in the longitudinal direction. In order to increase the available space for engaging the clips 32, some of the clip mounting holes 35 may be provided in the wing portions 34. The clips 32 and the members to be retained by the clips 32 may be positioned so as not to interfere with a height brake (not shown in the drawings) which restricts the vertical motion of the seat cushion 2 in plan view.

Further, it is preferable that some of the clip mounting holes 35 are provided in the vicinity of the wing portions 34 and the outer front mounting pieces 22b to reduce the stiffness around these portions. It is preferable that the clip mounting holes 35 are disposed in the front portion 20b located forward of the inclined portions 21, and not in the rear portion 20a of the main body 20. Since the load of the occupant is preferentially transmitted to the inclined portions 21, and the rear portion 20a which is flanked by the inclined portions 21, by providing the clip mounting holes 35 in the front portion 20b to which a relatively small part of the load is applied, the reduction in the mechanical strength of the rear portion 20a can be avoided. A part of the clip mounting holes 35 may be provided between the inner edges of the two inclined portions 21. Since the clip mounting holes 35 arranged in this manner are generally located in lower positions than the inclined portions 21, even if the tips of the clips 32 attached to the back side of the internal support member 8 should project to the front side, the tips of the clip 32 are not likely to substantially impair the seating comfort of the vehicle seat 1.

The part of the front portion 20b of the main body 20 adjoining the openings 28 on each outer side thereof is formed with a crank portion 36 so that a front part thereof is more recessed downward than a rear part thereof as can be seen in side view. Thereby, the reduction in stiffness caused by the presence of the side notch 33 may be made up for. Since the crank portion 36 causes the front part of the front portion 20b of the main body 20 adjoining the openings 28 on each outer side thereof to be lower than the rear part thereof, the legs of the occupant are not likely to be interfered by these crank portions 36. Further, a part of the main body 20 adjacent to the laterally outer edge of each rectangular opening 28 is provided with a curved portion 37 which is curved as seen in front view so as to be connected to the part of the front portion 20b of the main body 20 which is lowered due to the provision of the crank portion 36. The curved portion 37 extends from a part of the main body 20 adjoining the rectangular opening 28 to a part adjoining the front edge of the main body 20. The curved portion 37 compensates for the reduced stiffness of the part of the main body 20 which is reduced in stiffness owing to the provision of the rectangular openings 28. Each wing portion 34 is provided with a flange 38 protruding upward along the outer side edge thereof. The front portion 20b is provided with a front wall portion 39 which extend laterally outward from the front end of the curved portion 37 and extends to the front end of the flange 38. A downwardly recessed part 40 is formed in the front part of each side part of the front portion 20b jointly by the crank portion 36, the curved portion 37, the flange 38, and the front wall portion 39. When the clip mounting holes 35 are in the recessed part 40 of the front portion 20b of the main body 20, and another member is retained by the clip 32 on the underside of the main body 20, the tips of the clip 32 that may protrude from the upper surface of the main body 20 are prevented from impairing the seating comfort of the vehicle seat 1, or adversely affecting the pressure sensor 25.

Even though the front part of the internal support member 8 is lower as compared to the rear part of the internal support member 8, since the buttocks of the occupant are supported in a large part by the rear part, the influences of the recessed part 40 on the function to support the buttocks of the occupant is small. Since the clip mounting holes 35 arranged in this manner are generally located in lower positions than the inclined portions 21, even if the tips of the clips 32 attached to the back side of the internal support member 8 should project to the front side, the clips 32 are not likely to substantially impair the seating comfort of the vehicle seat 1. The crank portion 36, the curved portion 37, the flange 38, and the front wall portion 39 that jointly form the recessed part 40 that does not adversely affect the seating comfort of the vehicle seat 1 increase the stiffness of this part of the main body 20 so that the outer front mounting pieces 22b provided on either side of the main body 20 can be mounted to the front cross member 15 in a highly stable manner.

A connecting portion 41 having the wire 24 buried therein is defined between the sensor mounting portion 26 and the central front mounting piece 22a. The outer contour of the central front mounting piece 22a is substantially rectangular in plan view, and has a lateral width greater than the lateral width of the sensor mounting portion 26. Therefore, the swinging motion of the internal support member 8 about a longitudinal axis is suppressed. Preferably, the left edge of the sensor mounting portion 26 is located to the right of the left edge of the central front mounting piece 22a, and the right edge of the sensor mounting portion 26 is located to the left of the right edge of the central front mounting piece 22a.

The central front mounting piece 22a is provided with rectangular mounting piece openings 42 in the part thereof that wraps around and engages the front cross member 15.

The first mounting piece openings 42 allow the internal support member 8 to be locally flexible while avoiding a decrease in the mounting strength of the central front mounting piece 22a to the front cross member 15. The central first mounting piece openings 42 include two inner openings 42a and two outer openings 42b provided on either side of the inner opening 42a. The lateral lengths of the inner openings 42a and the outer openings 42b are substantially equal to each other, and the fore and aft length of the inner openings 42a is greater than the fore and aft length of the outer openings 42b. Owing to such a difference in size between the inner openings 42a and the outer openings 42b, the laterally middle part of the internal support member 8 can be made flexible in such a manner that an excessive load is prevented from being applied to the pressure sensor 25. Further, since the inner openings 42a have a larger lateral expanse that overlaps with the sensor mounting portion 26 than the outer openings 42b, the flexibility of the sensor mounting portion 26 is increased.

The parts of the outer front mounting pieces 22b that are wrapped around and engage the front cross member 15 are each provided with a rectangular second mounting piece opening 43 and a rectangular cutout 44 provided on the laterally outer side edge thereof. The lateral lengths of the second mounting piece opening 43 and the cutout 44 are substantially equal to each other, and the fore and aft lengths of the second mounting piece opening 43 and the cutout 44 are also substantially equal to each other. The second mounting piece opening 43 and the cutout 44 allow the laterally outer part of the internal support member 8 to be relatively flexible without causing the mounting strength of the outer front mounting piece 22b to the front cross member 15 to be decreased.

The sensor mounting portion 26 has mounting portion openings 45 which are covered by the pressure sensor 25 from above, engaging claws 46 engaging the pressure sensor 25, and a pair of locking ribs 47 engaging or abutting against either side edge of the pressure sensor 25. Since the sensor mounting portion 26 is aligned with the central front mounting piece 22a in front view, the pressure sensor 25 may be considered as being mounted in a relatively stable part of the internal support member 8. Furthermore, the mounting stability of the pressure sensor 25 is enhanced by being engaged by the engaging claws 46 and the locking ribs 47. The engaging claws 46 are located laterally inside of the lateral edges of the central front mounting piece 22a, and are aligned with at least a part of the first mounting piece opening 42 in front view. Therefore, the part of the internal support member 8 to which the load applied to the pressure sensor 25 is transmitted can be provided with an increased flexibility with respect to the front cross member 15. Preferably, the mounting portion openings 45 are aligned with a part of the clip mounting holes 35 in front view so that the sensor mounting portion 26 and the adjoining part of the internal support member 8 are made more flexible.

Some of the clip mounting holes 35 may be provided in the pan frame 17 as shown in FIG. 3.

Since the pressure sensor 25 is positioned so as to be offset forward relative to the inclined portions 21 and the rectangular openings 28 are provided on either side of the pressure sensor 25, the pressure applied to the pressure sensor 25 is amplified. The stability of the sensor mounting portion 26 could be reduced owing to the presence of the openings 28, but since the lateral width of the central front mounting piece 22a is greater than the lateral width of the sensor mounting portion 26, the pressure sensor 25 is prevented from swinging or otherwise moving relative to the internal support member 8. Since the pressure applied to the pressure sensor 25 is amplified, and the sensor mounting portion 26 is adequately stabilized, the pressure sensor 25 is enabled to detect a seating of an occupant in an accurate manner.

The present invention has been described in terms of a specific embodiment, but is not limited by such an embodiment, and can be modified in various ways without departing from the spirit of the present invention. For instance, the sensor mounting portion 26 may also be positioned more rearward than the longitudinally central part of the seat cushion. In such a case, the rear mounting portion would be configured similarly as the front mounting portion.

The vehicle seat of the present invention can also be applied to seats of other forms of vehicles such as aircraft and watercraft.

The invention claimed is:

1. A vehicle seat having a seat cushion, the vehicle seat comprising:
   a seat cushion frame including a pair of side members extending along either side of the seat cushion frame, a first cross member connecting first ends of the side members to each other, and a second cross member connecting second ends of the side members to each other;
   an internal support member for supporting an occupant, the internal support member including a main body in plate or sheet form positioned within the seat cushion frame and extending substantially in parallel with the seat cushion frame, a first mounting portion extending from a first edge of the main body adjoining the first cross member and engaged by the first cross member, and a second mounting portion extending from a second edge of the main body adjoining the second cross member and engaged by the second cross member;
   a cushion pad placed on an upper side of the seat cushion frame and the internal support member;
   a skin member covering the cushion pad; and
   a pressure sensor mounted on a part of an upper surface of the internal support member which is closer to the first cross member than the second cross member;
   wherein the main body of the internal support member is formed with a pair of openings positioned on either side of a central longitudinal line, a sensor mounting portion supporting the pressure sensor being defined between mutually adjoining edges of the openings, and
   wherein the first mounting portion includes a central first mounting piece which is positioned laterally centrally and has a greater width than a width of the sensor mounting portion,
   wherein the central first mounting piece is formed with a pair of inner openings arranged symmetric to each other about the longitudinal center line, and a pair of outer openings arranged symmetric to each other about the longitudinal center line on either outer side of the inner openings, the inner openings being larger than the outer openings,
   wherein the sensor mounting portion is provided with a pair of engaging claws that engage the pressure sensor, the engaging claws being positioned laterally between side edges of the central first mounting piece in front view.

2. The vehicle seat according to claim 1, wherein the seat cushion frame is substantially rectangular in shape in plan view, and the openings are substantially rectangular in shape in plan view, and are arranged in a symmetric relationship to the longitudinal center line.

3. The vehicle seat according to claim 1, wherein the first cross member consists of a front cross member, and the second cross member consists of a rear cross member.

4. The vehicle seat according to claim 1, wherein the main body of the internal support member is formed with a plurality of clip mounting holes in parts thereof located on either side of the sensor mounting portion.

5. The vehicle seat according to claim 1, wherein the central first mounting piece is formed with an opening.

6. The vehicle seat according to claim 1, wherein the inner openings overlap with the sensor mounting portion by a larger width than the outer openings in front view.

7. The vehicle seat according to claim 1, wherein the engaging claws align at least partly with the inner openings of the central first mounting piece in front view.

8. The vehicle seat according to claim 1, wherein the central first mounting piece consists of an integral part of the main body which is wrapped around the first cross member.

9. The vehicle seat according to claim 1, wherein the internal support member consists of a sheet of plastic material having a plurality of wires extending in a longitudinal direction insert molded therein, and one of the wires extends centrally through the sensor mounting portion.

10. The vehicle seat according to claim 1, wherein the first mounting portion includes a pair of outer first mounting pieces located on either side of the central first mounting piece, and each outer first mounting piece is formed with a rectangular opening and a cutout, the cutout being made on a side edge of the outer first mounting piece.

11. The vehicle seat according to claim 1, wherein the sensor mounting portion is further provided with a pair of engaging ribs configured to engage side edges of the pressure sensor, the engaging ribs being positioned laterally inward of side edges of the central first mounting piece in front view.

12. The vehicle seat according to claim 1, wherein a pair of inclined portions are provided on either lateral end part of the internal support member adjacent to the second cross member, each inclined portion inclining upward toward a laterally outer edge of the internal support member, and a plurality of openings are provided in a part of the internal support member located between the inclined portions.

* * * * *